US011129424B2

(12) United States Patent
Nishida

(10) Patent No.: US 11,129,424 B2
(45) Date of Patent: Sep. 28, 2021

(54) MASK WITH DISPLAY

(71) Applicant: NETAPPLI CO., LTD., Ishikawa (JP)

(72) Inventor: Makoto Nishida, Ishikawa (JP)

(73) Assignee: NETAPPLI CO., LTD., Ishikawa (JP)

(\*) Notice: Subject to any disclaimer, the term of this patent is extended or adjusted under 35 U.S.C. 154(b) by 0 days.

(21) Appl. No.: 17/054,094

(22) PCT Filed: Apr. 10, 2020

(86) PCT No.: PCT/JP2020/016191
§ 371 (c)(1),
(2) Date: Nov. 9, 2020

(87) PCT Pub. No.: WO2020/213541
PCT Pub. Date: Oct. 22, 2020

(65) Prior Publication Data
US 2021/0244109 A1  Aug. 12, 2021

(30) Foreign Application Priority Data

Apr. 16, 2019  (JP) .............................. JP2019-090197

(51) Int. Cl.
*A41D 13/11* (2006.01)
*G09F 21/02* (2006.01)
*A41D 27/08* (2006.01)
*G06F 1/16* (2006.01)

(52) U.S. Cl.
CPC ............ *A41D 13/11* (2013.01); *A41D 27/085* (2013.01); *G06F 1/163* (2013.01); *G06F 1/1652* (2013.01); *G09F 21/023* (2020.05)

(58) Field of Classification Search
CPC .. A41D 13/11–1192; A62B 23/00–025; A62B 7/10; A61M 16/0683–0688
See application file for complete search history.

(56) References Cited

U.S. PATENT DOCUMENTS

| 2016/0029716 A1 | 2/2016 | Duncan et al. |
| 2018/0000179 A1 | 1/2018 | Simon et al. |
| 2018/0078798 A1* | 3/2018 | Fabian ..................... A62B 7/10 |
| 2018/0213918 A1 | 8/2018 | Graves |

FOREIGN PATENT DOCUMENTS

| CN | 107799018 A | 3/2018 |
| JP | H09292850 A | 11/1997 |
| JP | 2007021031 A | 2/2007 |
| JP | 2011139893 A | 7/2011 |
| JP | 2015019920 A | 2/2015 |
| JP | 2018172807 A | 11/2018 |

OTHER PUBLICATIONS

International Search Report (ISR) dated Jul. 7, 2020, issued for International application No. PCT/JP2020/016191. (3 pages).

\* cited by examiner

*Primary Examiner* — Rachel T Sippel
(74) *Attorney, Agent, or Firm* — Law Office of Katsuhiro Arai

(57) ABSTRACT

A mask with display (1) is characterized by comprising: a mask body part (10) made of a pliable and breathable material to cover the bottom part of the user's face; a flexible display (100) covering the mask body part (10); and ear loops (11) attached on both end sides of the mask body part (10). The flexible display (100) is characterized by having multiple through holes for breathing. The mask, while also being breathable, allows the user to alter his/her facial appearance to a makeup face simply by wearing the mask.

11 Claims, 4 Drawing Sheets

[FIG. 1]
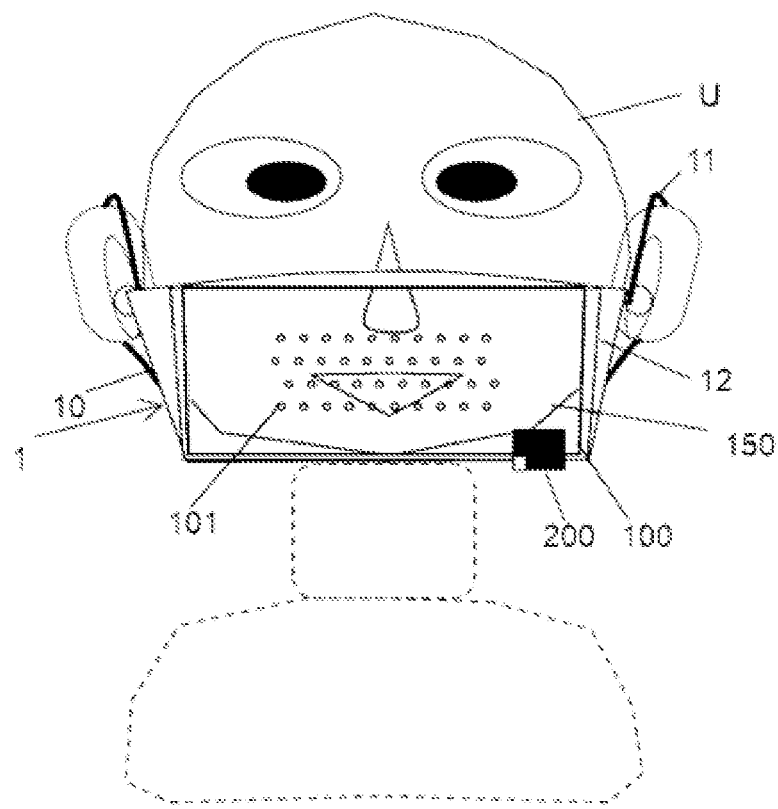
[FIG. 2]
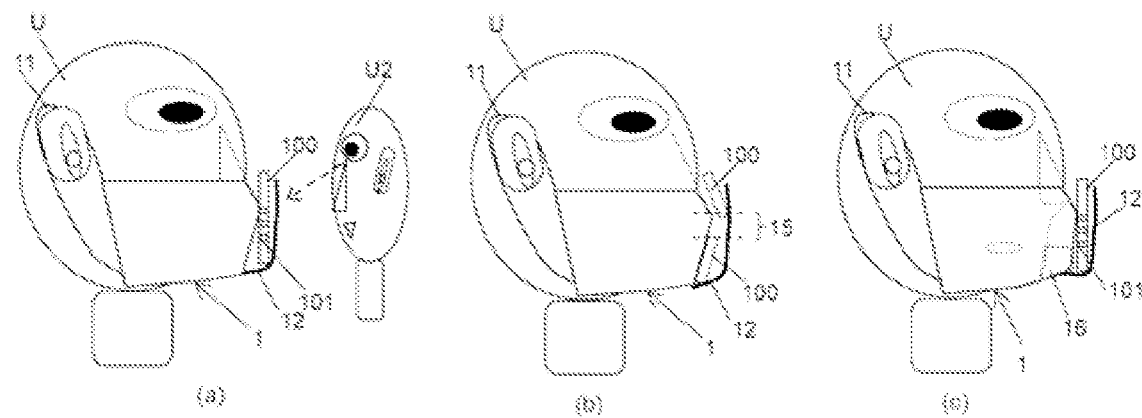

[FIG. 3]
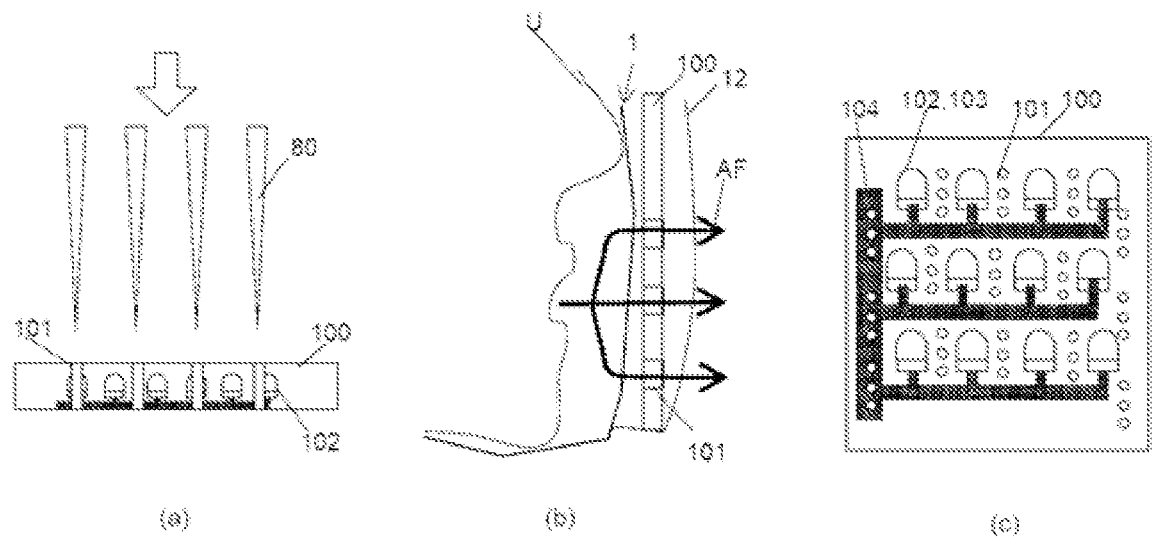
[FIG. 4]
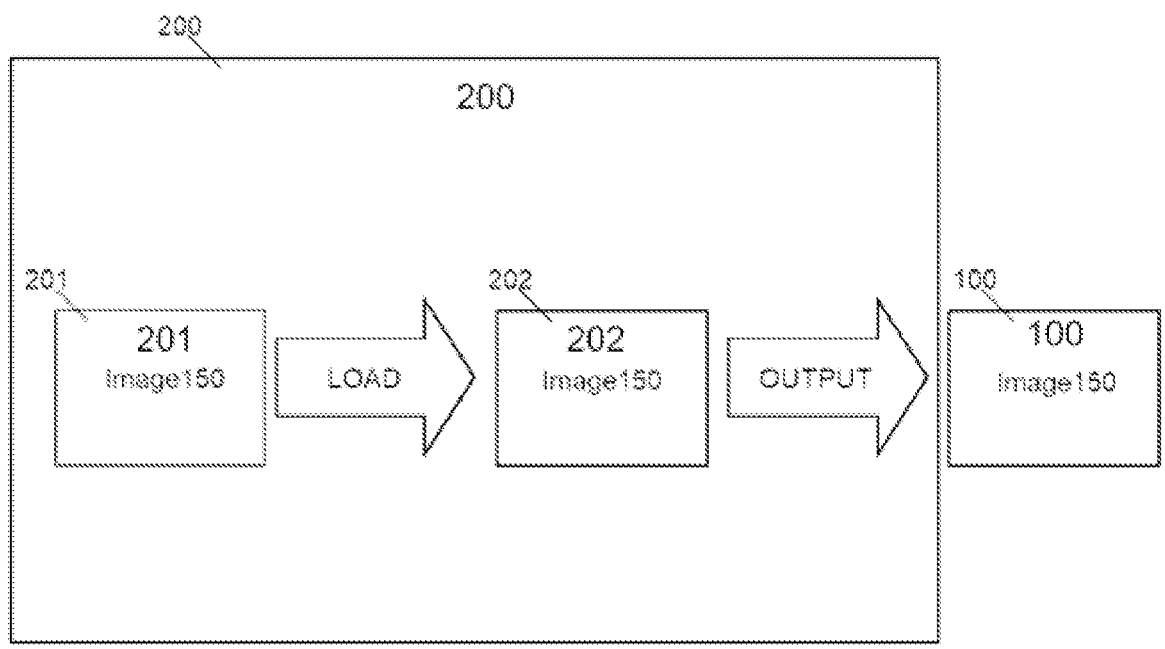

[FIG. 5]
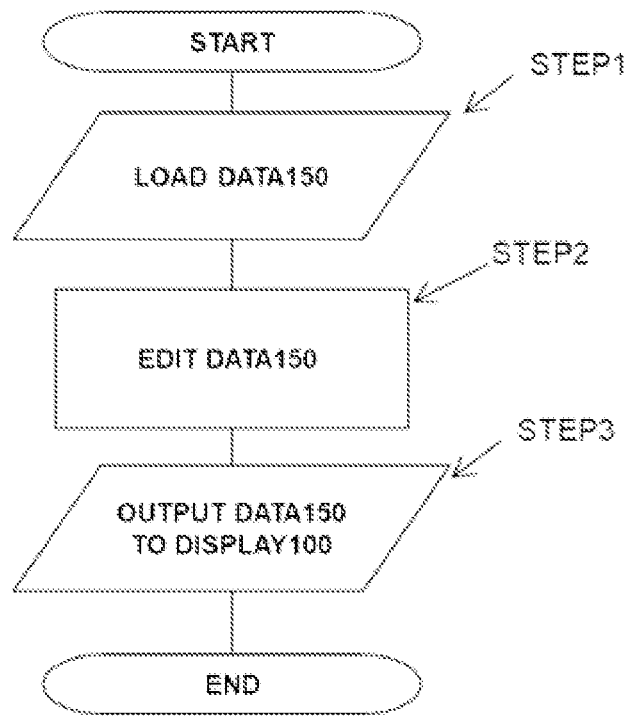

[FIG. 6]
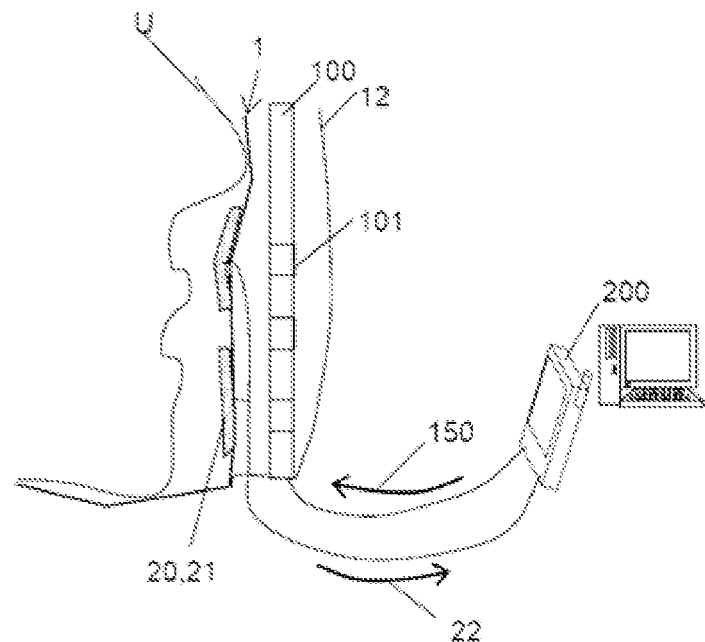
[FIG. 7]
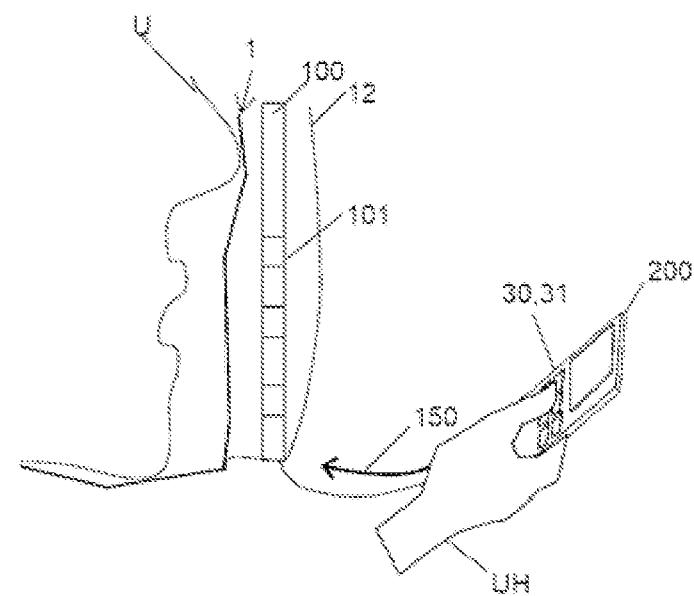

MASK WITH DISPLAY

CROSS-REFERENCE TO RELATED APPLICATIONS

This application is the U.S. National Phase under 35 U.S.C. §371 of International Application PCT/JP2020/016191, filed Apr. 10, 2020, which claims priority to Japanese Patent Application No. JP2019-090197, filed Apr. 16, 2019. The International Application was published under PCT Article 21(2) in a language other than English.

TECHNICAL FIELD

The present invention relates to a mask with display.

BACKGROUND ART

Masks that cover one's nose, mouth, or both to prevent the inhalation of dust particles and contraction of airborne infections are being sold and used. Many of these types of conventional masks in use have a rectangular mask body part made of fabric or other material pliable enough to be closely in contact with the skin, with elastic loops or other wearing members attached on both sides for hooking around the ears. Particularly in Japan, masks are used as articles of fashion or by women to cover their face when wearing no makeup, besides for the aforementioned purpose of preventing airborne infections. (In Japan, these masks are often called "non-medical masks" or "fashion masks.")

Patent Literature 1 discloses an art relating to masks, which involves using an auxiliary spacer in the part of the mask contacted by the mouth to prevent the mask from smudging the makeup or leaving marks on the face.

Patent Literature 2 discloses an art relating to masks, which involves attaching a filter pad to the mask body part in a manner not contacting the lips of the user to prevent sweating in the mask.

In the meantime, none of liquid crystal displays, plasma displays, cathode-ray tube displays, organic EL displays, flexible displays, and other existing image display devices can let air pass through the display for breathing.

Background Art Literature

Patent Literature

Patent Literature 1: Japanese Patent Laid-open No. 2015-19920
Patent Literature 2: Japanese Patent Laid-open No. 2011-139893

SUMMARY OF THE INVENTION

Problems to Be Solved by the Invention

The aforementioned masks in Patent Literatures 1 and 2 and existing masks present a problem in that, because the fabric constituting the mask body part covers the mouth and nearby area of the face, the user of the mask does not appear as aesthetically appealing to the eye of others as when the same user is not wearing the mask and has makeup on. Another problem is that the expression of the user is difficult to read.

In light of the aforementioned problems, an object of the present invention is to provide a mask that, while also being breathable, allows altering a user's facial appearance to a face with makeup simply by wearing the mask.

Means for Solving the Problems

The mask with display proposed by the present invention comprises: a mask body part made of a pliable and breathable material to cover the bottom part of the user's face including the mouth and nose; a flexible display covering the mask body part; and ear loops attached on both end sides of the mask body part; which is characterized in that the flexible display has multiple through holes for breathing, and the diameter of the through holes is 1 [mm] or smaller.

In addition, the mask with display proposed by the present invention is characterized in that the through holes are provided in a manner avoiding the light-emitting elements inside the flexible display.

In addition, the mask with display proposed by the present invention is characterized in that the mask body part has a pocket structure for supporting the flexible display in a manner covering the mask body part, and the pocket structure is made of a transparent, breathable, and pliable material.

In addition, the mask with display proposed by the present invention is characterized in that it has an image control computer for controlling images to be shown on the flexible display.

In addition, the mask with display proposed by the present invention is characterized in that the image control computer is a computer built into a mobile communication device.

In addition, the mask with display proposed by the present invention is characterized in that it has a sensor for detecting the movement of the user's mouth, and the image control computer controls the images according to signals received from the sensor.

In addition, the mask with display proposed by the present invention is characterized in that the sensor is either a piezoelectric sensor or microphone.

In addition, the mask with display proposed by the present invention is characterized in that it has either a keyboard or buttons, and the image control computer controls the images according to signals from the keyboard or buttons.

In addition, the mask with display proposed by the present invention is characterized in that it has a spacer for providing an air passage space between the mask body part and the bottom part of the face.

In addition, the mask with display proposed by the present invention is characterized in that the flexible display is comprised of multiple flexible displays that are placed compactly on the mask body apart from each other with enough spacing in between to let air pass through.

In addition, the mask with display proposed by the present invention is characterized in that the mask body part is shaped to cover the entire face of the user, including the eyes.

A program used with the mask with display proposed by the present invention is characterized in that it includes: Step 1 in which image data corresponding to the bottom part of the face is loaded from a computer memory; Step 2 in which the image data is processed; and Step 3 in which the image data is output to the flexible display.

Effects of the Invention

Since it uses a flexible display, the mask proposed by the present invention has the same wearing feel as any standard pliable mask, thus remaining physically less burdensome after many hours of wearing. Also, the flexible display provided on the mask allows the user to freely alter the bottom part of his/her facial appearance or the entire facial appearance, to instantly change to a desired face according to the situation. In addition, the flexible display can curve along and fit the shape of the face when the mask is worn, which reduces discomfort feeling when the user's facial appearance is altered. Furthermore, use of multiple flexible displays by laying them on the mask body part from end to end makes it easy for the mask to fit or closely contact faces of various shapes, while leaving enough spacing between these multiple flexible displays to let air flow through allows the user to breathe.

Simply by displaying on the flexible display a photograph or video of the user's face when having makeup on, the face of the user with makeup on can artificially be reproduced, and what is more, this can be done in just the seconds it takes for the user to hook the ear loops of the mask onto his/her ears.

The user's face can also be altered using computer graphics showing the bottom parts of the faces of fictitious characters, actresses, etc., that have been saved on an image control computer for controlling images to be shown on the flexible display.

Providing the flexible display with through holes for letting air pass through allows the user to breathe. When multiple through holes are provided in the flexible display, the individual through holes can be sized to a small diameter so that the areas of missing pixels caused by the through holes become less conspicuous. So long as they are provided in a manner avoiding the areas where the light-emitting elements of the flexible display exist, the aforementioned through holes can effectively prevent missing pixels on the flexible display that would otherwise be caused by the through holes.

Since the flexible display can show video images, it is possible, by providing the mask body part with a piezoelectric element or other sensor that detects the movement of the user's mouth, to play animations in which the user's mouth reproduced on the flexible display over the mask body part moves synchronously with the actual movement of the user's mouth. This facilitates the conveyance of the user's expression and emotions to third parties.

Text entered by the user at an arbitrary timing on a mobile phone, for example, can be displayed on the mask at the timing the text is entered.

When a pocket structure made of a transparent, pliable and breathable material is provided on the mask body part side to support the flexible display on the mask body part in a manner covering the mask body part, installation and removal of the flexible display to/from the mask body part will become easy and third parties looking at the flexible display will not be prevented from viewing the images thereon. Furthermore, breathing of the user will not be interfered with.

Breathing of the user is further facilitated by providing a spacer for providing an air passage space between the mask body part and the bottom part of the user's face.

BRIEF DESCRIPTION OF THE DRAWINGS

FIG. 1 A front view showing the mask in the first embodiment.
FIG. 2 Cross-sectional views (a), (b), (c) showing the mask in the first embodiment.
FIG. 3 Enlarged cross-sectional views (a), (b) and enlarged front view (c) of the through holes.
FIG. 4 A block diagram of how an image is processed by the image control computer.
FIG. 5 A flowchart of how an image is processed by the image control computer.
FIG. 6 A drawing showing the constitution of the mask in the second embodiment.
FIG. 7 A drawing showing the constitution of the mask in the third embodiment.

MODE FOR CARRYING OUT THE INVENTION

First Embodiment of Mask with Display

The first embodiment of the mask with display proposed by the present invention is described below using drawings.

As shown in FIG. 1, the mask with display 1 roughly comprises a mask body part 10, ear loops 11, a flexible display 100, and an image control computer 200.

The mask body part 10 is a sheet-shaped object for covering the bottom part of the user U's face including the mouth and nose, and made of a pliable and breathable material. Examples of materials for the mask body part 10 include fabric, gauze, etc., just like for general medical masks. It should be noted that the shape of the mask body part 10 is not limited in any way so long as it can cover the bottom part of the user U's face including the mouth and nose, and if a large area of the facial appearance is desired to be altered, a mask body part 10 of a shape covering not only the mouth and nose, but the entire face including the eyes, of the user U, may be used instead.

The ear loops 11 are members that are pulled behind the user U's ears to secure the mask body part 10, where fabric, rubber and other flexible materials are used for the ear loops 11, just like for general medical masks.

The pocket structure 12 is a member for supporting or securing the flexible display 100 on/to the mask body part 10 in a manner covering the mask body part 10. As shown in FIG. 2 (a), the pocket structure 12 is made of a breathable material so as not to interfere with the user U's breathing, and furthermore the pocket structure 12 is made of a transparent material so as not to prevent a third party U2 near the user U from viewing the image on the flexible display 100. Also, the pocket structure 12 is made of a pliable material to make the wearing of the mask physically less burdensome. Examples of materials for the pocket structure 12 include, for example, a transparent soft vinyl chloride material having holes provided therein for letting air pass through. While this embodiment uses an example where the pocket structure 12 is used to support the flexible display 100 on the mask body part 10 in a manner covering the mask body part 10, the mask proposed by the present invention is not limited to this and, for example, the flexible display 100 may be bonded or thermally-fused to and thereby integrated with the mask body part 10, or the flexible display 100 itself may constitute the mask body part 10. It should be noted that, while the mask with display 1 normally has a flexible display 100 placed on the front side of the mask body part 10 in a manner covering the mask body part 10, the display with mask 1 may, if used as a reversible mask, have flexible displays 100 placed on both the front side and back side of the mask body part 10.

The flexible display 100 is a pliable, deformable, sheet-shaped image display device placed in a manner covering the mask body part 10 and used for altering the user U's facial appearance at arbitrary timings by showing images 150 corresponding to the bottom part of the user U's face. While flexible displays adopting organic EL or inorganic EL light emission methods or methods that use multiple micro-LEDs or LEDs to constitute pixels are available, the flexible display 100 of the mask proposed by the present invention is not limited to these methods and any flexible display 100 may be used without limitation so long as it is a pliable image display device. Since the flexible display 100 is pliable, it can curve along the shape of the user U's face when the mask is worn, which reduces discomfort feeling when the facial appearance is altered. It should be noted that, while FIG. 1 and FIG. 2 (a) explain an example representing a constitution that uses only one flexible display 100, the flexible display 100 may be constituted with multiple small flexible displays 100 as shown in FIG. 2 (b) because this facilitates the deforming of the mask body part 10 so that it will closely contact or fit faces of various shapes with ease. Furthermore, when laying multiple flexible displays 100 on the mask body part 10 from end to end, placing these multiple flexible displays 100 with enough spacing 15 left in between to let air pass through, as shown in FIG. 2 (b), will facilitate the user U's breathing as air flows in through this spacing 15.

The flexible display 100 has multiple through holes 101 (or arrays of through holes 101) to let air pass through, so as not to interfere with the user U's breathing. The method for providing through holes 101 in the flexible display 100 may be one that uses needle-like objects 80 to puncture through holes 101 in the flexible display 100, as shown in FIG. 3 (a).

While providing a through hole 101 in a light-emitting area or light-emitting element 102 of the flexible display 100 causes lost pixels (or missing pixels) in the area, light has a property to diffuse and thus the smaller the diameter size of the through hole 101, the less visible the lost pixels (or missing pixels) caused by the through hole 101 become. This is governed by the same principle that makes missing pixels of 1 [mm] or smaller in size buried in the surrounding light and almost invisible, but makes missing pixels of 1 [cm] or larger in size easily visible. For this reason, desirably the diameter size of through holes 101 is kept as small as possible. In the mask proposed by the present invention, multiple through holes 101 are used to distribute the flow of air AF for breathing inside the flexible display 100, as shown in FIG. 3 (b), thereby allowing the individual through holes 101 to have a smaller size. For example, providing several thousands to several tens of thousands of through holes ensures a sufficient flow rate of air for breathing, even when the individual through holes 101 are approx. 0.5 to no more than 1 [mm] in size (i.e., there is an offsetting relationship between the size and number of through holes 101), indicating that this strategy can be used to make any missing pixels almost invisible.

Since there is an offsetting relationship between the size and number of through holes 101, the size of through holes 101 can be reduced by increasing the number of through holes 101. This means that through holes 101 can be provided in a manner efficiently skirting around the light-emitting elements 102, as shown in FIG. 3 (c), when many through holes 101 are used. For example, if the flexible display 100 uses micro-LEDs 103 (or LEDs) as its light-emitting elements 102, through holes 101 can be punctured only in the areas between the micro-LEDs 103, as shown in FIG. 3 (c).

It should be noted that the smaller the size of through holes 101, the less damaging they are to the light-emitting elements 102 and conductive wires 104 feeding to (or conductor parts of the circuit feeding to) the light-emitting elements 102, thus reducing the risk of wire breakage. If through holes 101 larger than the feeding conductive wires 104 are punctured in the flexible display 100, it is better to check and confirm no occurrence of wire breakage.

The image control computer 200 is a computer for controlling the images displayed on the flexible display 100, and used to output images 150 corresponding to the bottom part of the face to the flexible display 100. The image control computer 200 may also be used to load images 150 from an external computer memory. The image control computer 200 may also be used to process images 150 with an image processing part 202 provided inside. For the image control computer 200, not only a built-in IC chip pre-installed in the flexible display 100 as shown in FIG. 1, but also an external personal computer, server computer, ASIC, or other computer built into a smartphone or other mobile communication device, may be used, for example.

It should be noted that, if a smartphone or other mobile communication device is used as the image control computer 200, data transmission to the flexible display 100 of image 150 corresponding to the bottom part of the face should be performed using any of the following communication means: wireless communication, infrared communication, and wired communication via a USB cable.

FIG. 4 shows a block diagram of how an image is processed inside the image control computer 200.

The user U's facial appearance can be altered to a desired facial appearance at an arbitrary timing through the following steps, as shown in FIG. 4: in the first step, or STEP 1, an image 150 corresponding to the bottom part of the user U's face that has been saved beforehand in the computer memory 201 inside (or outside) the image control computer 200 is loaded; in the next step, or STEP 2, the image 150 is processed, if necessary, in the image processing part 202; and in the last step, or STEP 3, it is output to the flexible display 100. This means that, by saving beforehand in the computer memory 201 and outputting to the flexible display 100 an image 150 corresponding to the bottom part of the user U's face wearing makeup, the user U can, albeit artificially, complete makeup, simply by wearing the mask body part 10. It should be noted that, for the image 150 saved in the computer memory 201, a computer graphic of an actress or fictitious character may be used. When the image 150 is processed, the bottom part of the user U's face wearing makeup may be reproduced using CG. If the mask body part 10 covers not only the mouth and nose, but also the entire face including the eyes, of the user U, then an image of the entire face must be used as the image 150.

FIG. 5 shows a flowchart of how an image is processed inside the image control computer 200.

As shown in FIG. 5, the flow is as follows: first, in STEP 1, image data (denoted as "DATA150" in FIG. 5) of an image 150 corresponding to the bottom part of the user U's face is loaded from the computer memory 201; in the next step, or STEP 2, the image data of the image 150 is processed; and in the last step, or STEP 3, the image data of the image 150 is output to the flexile display 100, upon which the processing ends.

There may be a spacer 16 for providing an air passage space S between the mask body part 10 and the bottom part of the face, as shown in FIG. 2 (c), because doing so improves the flow of air near the bottom part of the user U's face to assist the user U's breathing. It should be noted that the material for the spacer 16, while possibly a low-resilience urethane, expanded polystyrene, rubber, or other flexible material, is not limited to the foregoing and, for example, a resin, etc., having moderate hardness may also be used. It should be noted that, if through holes 101 are not provided in the flexible display 100, some idea must be devised, such as providing a greater distance between the mask body part 10 and the bottom part of the face, to prevent the user U from suffocating.

Second Embodiment of Mask with Display

The second embodiment of the mask with display proposed by the present invention is explained below using drawings; it should be noted, however, that locations constitutionally identical to those in the mask with display 1 in the aforementioned first embodiment are denoted with the same symbols and not explained.

As shown in FIG. 6, the mask with display 1 in this embodiment has a sensor 20 for detecting the movement of the user U's mouth, and the image control computer 200 controls images 150 (or image data) corresponding to the bottom part of the face according to signals 22 from this sensor 20.

The flexible display 100 is capable of showing video images, so placing a piezoelectric element 21 (film- or sheet-shaped piezoelectric element, etc.) on the mask body part 10 as the sensor 20 at a position contacted by the user U's lips allows for constant monitoring of the movement of the user U's lips based on signals 22 from the piezoelectric element 21, which makes it possible to play animations in which an image 150 of the bottom part of the user U's face, including the mouth, as output to the flexible display 100, moves synchronously with the movement of the user U's mouth. It should be noted that, although an example where a piezoelectric element 21 is used as the sensor 20 is explained in this embodiment, a microphone or mic may be used as the sensor 20 so that the movement of the user U's mouth can be monitored as the signals 22 based on voice signals or voice waveforms.

Third Embodiment of Mask with Display

The third embodiment of the mask with display proposed by the present invention is explained below using drawings; it should be noted, however, that locations constitutionally identical to those in the mask with display 1 in the aforementioned first embodiment are denoted with the same symbols and not explained.

As shown in FIG. 7, the mask with display 1 in this embodiment has either a keyboard 30 or buttons 31, and the image control computer 200 controls images 150 (or image data) corresponding to the bottom part of the face based on signals from either the keyboard 30 or buttons 31. This means that text entered at an arbitrary timing by the user's hand UH, for example, via the keyboard 30, can be synthesized with an image 150 corresponding to the bottom part of the face and displayed on the mask at the timing the text is entered. As another idea, an answer button on a mobile phone may be used as one of the buttons 31 so that a text string or symbol indicating that the user is on a call can be displayed on the mask with display 1 at the timing the answer button is pressed.

INDUSTRIAL FIELD OF APPLICATION

The present invention is a mask for altering the bottom part of the facial appearance or entire facial appearance of the user to an arbitrary face at an arbitrary timing, and because it uses a flexible display in which through holes are provided, wearing the mask is physically less burdensome and does not present concerns for injury or suffocation. Based on the above, the present invention has industrial applicability.

DESCRIPTION OF THE SYMBOLS

U User
U2 Third party (person other than the user)
UH User's hand
S Space (for air passage)
AF Flow of air (for breathing)
1 Mask with display (mask proposed by the present invention)
10 Mask body part
11 Ear loop
12 Pocket structure
15 Spacing (interspace)
16 Spacer
20 Sensor
21 Piezoelectric element
22 Signal (sensor)
30 Keyboard
31 Button
80 Needle-like object
100 Flexible display
101 Through hole (for breathing)
102 Light-emitting element
103 Micro-LED
104 Conductive wire (for feeding to light-emitting element)
150 Image (image of face)
200 Image control computer
201 Computer memory
202 Image processing part

What is claimed is:

1. A mask comprising:
   a mask body part made of a pliable and breathable material to cover a bottom part of a user's face including the mouth and the nose;
   a flexible display covering the mask body part; and
   ear loops attached on both end sides of the mask body part;
   characterized in that the flexible display has multiple through holes for breathing, and a diameter of the through holes is 1 mm or smaller;
   characterized in that the through holes are provided in a manner skirting around light-emitting elements inside the flexible display.

2. The mask according to claim 1, characterized in that the mask body part has a pocket structure for supporting the flexible display in a manner covering the mask body part, and the pocket structure is made of a transparent, breathable, and pliable material.

3. The mask according to claim 1, characterized in that the mask has an image control computer for controlling images to be shown on the flexible display.

4. The mask according to claim 3, characterized in that the image control computer is a computer built into a mobile communication device.

5. The mask according to claim 3, characterized in that the mask has a sensor for detecting a movement of the user's mouth, and the image control computer controls the images according to signals received from the sensor.

6. The mask according to claim 5, characterized in that the sensor is either a piezoelectric sensor or microphone.

7. The mask according to claim 3, characterized in that the mask has either a keyboard or buttons, and the image control computer controls the images according to signals from the keyboard or buttons.

8. The mask according to claim 1, characterized in that the mask has a spacer for providing an air passage space between the mask body part and the bottom part of the face.

9. The mask according to claim 1, characterized in that the flexible display is comprised of multiple flexible displays that are placed compactly on the mask body apart from each other with enough spacing in between to let air pass through.

10. The mask according to claim 1, characterized in that the mask body part is shaped to cover an entire face of the user including the eyes.

11. A program executed by a computer processor and used with the mask according to claim 3, characterized by including: step 1 in which image data corresponding to the bottom part of the face is loaded from a computer memory; step 2 in which the image data is processed; and step 3 in which the image data is output to the flexible display.

* * * * *